United States Patent
Chue et al.

(10) Patent No.: US 7,136,242 B1
(45) Date of Patent: Nov. 14, 2006

(54) SERVO WRITING SUBSTANTIALLY LINEAR SERVO WEDGES TO REDUCE OVERWRITE EFFECT IN PERPENDICULAR MAGNETIC RECORDING

(75) Inventors: Jack M. Chue, Los Altos, CA (US); William C. Tipton, II, Gilroy, CA (US); Daniel B. Razum, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/009,761

(22) Filed: Dec. 9, 2004

(51) Int. Cl.
*G11B 5/09* (2006.01)

(52) U.S. Cl. .......................... 360/51; 360/75
(58) Field of Classification Search ............... None
See application file for complete search history.

(56) References Cited

U.S. PATENT DOCUMENTS

| | | | | |
|---|---|---|---|---|
| 5,162,955 A | * | 11/1992 | Burdenko | 360/77.02 |
| 5,247,498 A | * | 9/1993 | Takekoshi et al. | 369/30.13 |
| 5,315,469 A | | 5/1994 | McNeil | |
| 5,559,645 A | * | 9/1996 | Miyazawa et al. | 360/51 |
| 5,739,975 A | * | 4/1998 | Parks et al. | 360/81 |
| 5,796,690 A | * | 8/1998 | Kanno | 369/47.18 |
| 5,995,341 A | | 11/1999 | Tanaka et al. | |
| 6,256,164 B1 | * | 7/2001 | Choi | 360/97.01 |
| 6,388,829 B1 | * | 5/2002 | Nazarian | 360/48 |
| 6,504,675 B1 | | 1/2003 | Shukh et al. | |
| 6,771,443 B1 | * | 8/2004 | Szita et al. | 360/51 |
| 6,924,957 B1 | * | 8/2005 | Shimomura | 360/75 |
| 2002/0015253 A1 | | 2/2002 | Litvinov et al. | |
| 2003/0142435 A1 | * | 7/2003 | Tomiyama et al. | 360/75 |
| 2003/0184906 A1 | | 10/2003 | Hanson et al. | |
| 2003/0223149 A1 | | 12/2003 | Kimura et al. | |
| 2004/0061967 A1 | | 4/2004 | Lee et al. | |

FOREIGN PATENT DOCUMENTS

JP          2004227735 A * 8/2004

* cited by examiner

*Primary Examiner*—K. Wong
(74) *Attorney, Agent, or Firm*—Howard H. Sheerin, Esq.

(57) ABSTRACT

A disk drive is disclosed comprising a disk having a plurality of servo sectors forming a plurality of substantially linear servo wedges extending from an outer diameter of the disk to an inner diameter of the disk, wherein each servo sector is written using perpendicular magnetic recording. The disk drive further comprises a head coupled to a distal end of an actuator arm that is rotated by a rotary actuator about a pivot in order to actuate the head radially over the disk in a substantially arcuate path.

4 Claims, 8 Drawing Sheets

INNER DIAMETER

FIG. 2B
(Prior Art)

MIDDLE DIAMETER

FIG. 2C
(Prior Art)

OUTER DIAMETER

SERVO WRITING SUBSTANTIALLY LINEAR SERVO WEDGES TO REDUCE OVERWRITE EFFECT IN PERPENDICULAR MAGNETIC RECORDING

BACKGROUND OF THE INVENTION

1. Field of the Invention

The present invention relates to disk drives. In particular, the present invention relates to servo writing substantially linear servo wedges to reduce the overwrite effect in perpendicular magnetic recording.

2. Description of the Prior Art

Figure 1:
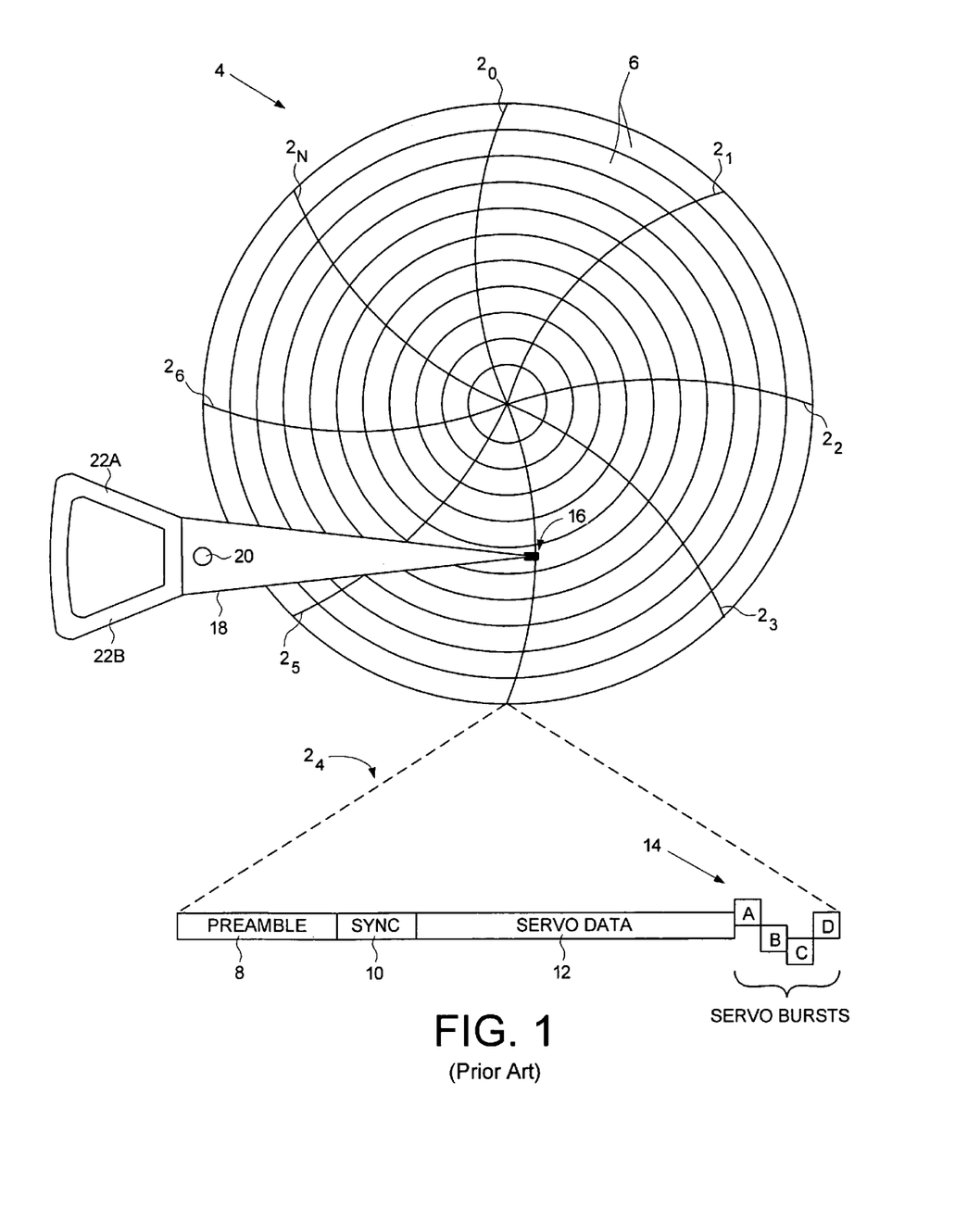
FIG. 1 shows a prior art disk drive wherein servo sectors are written to a disk using the head internal to the disk drive, thereby forming substantially arcuate servo wedges.

When manufacturing a disk drive, servo sectors $2_0$–$2_N$ are written to a disk 4 which define a plurality of radially-spaced, concentric data tracks 6 as shown in the prior art disk format of FIG. 1. Each data track 6 is partitioned into a plurality of data sectors wherein the servo sectors $2_0$–$2_N$ are considered "embedded" in the data sectors. Each servo sector (e.g., servo sector 24) comprises a preamble 8 for synchronizing gain control and timing recovery, a sync mark 10 for synchronizing to a servo data field 12 comprising coarse head positioning information such as a Gray coded track addresses for use during seeking, and servo bursts 14 which provide fine head positioning information for use during tracking. In a "headerless" format, the servo data field 12 also includes information identifying the data sectors between the servo sectors.

The servo sectors $2_0$–$2_N$ are typically written to the disk 4 using the head 16 internal to the disk drive, for example using an external servo writer or using a self-servo writing technique. An external servo writer inserts a positioning pin into the head disk assembly (HDA) of the disk drive to actuate an actuator arm 18 about a pivot 20 and thereby actuate the head 16 radially over the disk 4 while writing the servo sectors $2_0$–$2_N$. Rotating the actuator arm 18 about the pivot 20 causes the head 16 to traverse an arcuate path from the outer to inner diameter of the disk 4 which forms substantially arcuate servo wedges on as shown in FIG. 1.

A rotary actuator, such as a voice coil motor, is typically used to actuate the head 16 over the disk 4 during a self-servo writing technique as well as during the disk drive's normal operation. Current is passed through a voice coil comprising a first leg 22A and a second leg 22B attached to the base of the actuator arm 18. The resulting magnetic flux interacts with the magnetic flux of permanent magnets (not shown) creating a torque that rotates the actuator arm 18 about the pivot 20 in order to access a target data track 6 during write and read operations.

Perpendicular magnet recording is a recent development in disk drive technology that provides a significant increase in linear bit density as compared to conventional longitudinal magnetic recording. With perpendicular magnet recording, the head 16 comprises a write element having a leading pole and a trailing write pole, wherein a write coil is wrapped around the write pole. The disk 4 comprises a high permeability magnetic layer underneath a perpendicularly magnetized thin film layer such that an image of the write pole is produced in the high permeability magnetic layer when the write coil is energized with current.

Figure 2A:
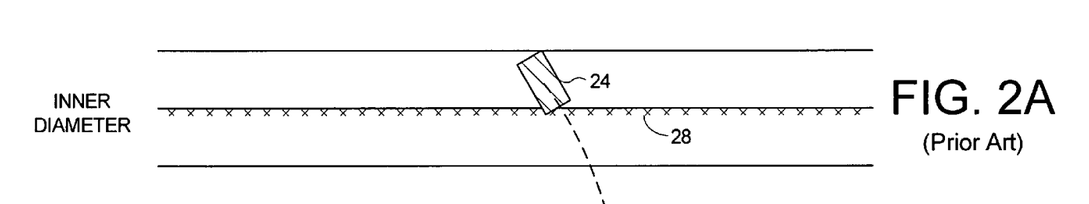
FIGS. 2A–2C illustrate a problem with the prior art technique of writing arcuate servo wedges using perpendicular magnetic recording wherein a corner of the write pole swings out due to the skew effect and overwrites a band of previously written servo data.
Figure 2B:
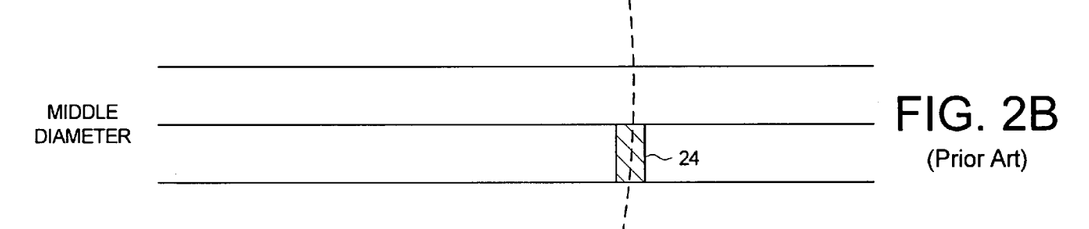
Figure 2C:
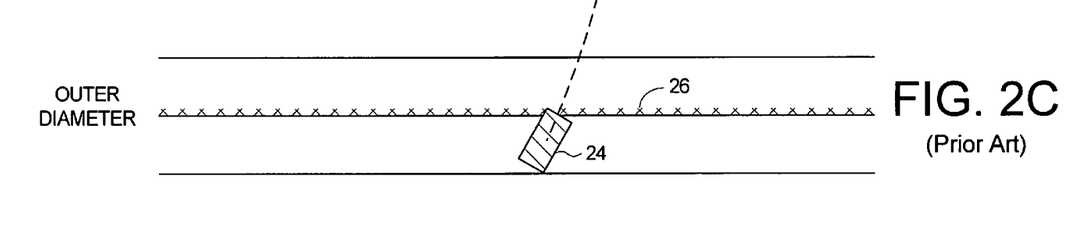

FIGS. 2A–2C illustrate a problem that manifests when servo writing the disk 4 using the head 16 internal to the disk drive with the new perpendicular magnetic recording technique. When writing the servo sectors $2_0$–$2_N$ from the inner diameter of the disk (FIG. 2A) toward the outer diameter of the disk (FIG. 2C), the skew angle of the write pole 24 as it approaches the outer diameter causes the inner corner of the write pole 24 to "swing out" and overwrite a band 26 of the previously written servo data. Similarly, when writing the servo sectors $2_0$–$2_N$ from the outer diameter of the disk (FIG. 2C) toward the inner diameter of the disk (FIG. 2A), the skew angle of the write pole 24 as it approaches the inner diameter causes the inner corner of the write pole 24 to "swing out" and overwrite a band 28 of the previously written servo data. The overwritten band (26 or 28) creates a "seam" between adjacent servo sectors, as well as a seam within each servo sector (including the servo bursts 14) if multiple revolutions are used to "stitch" together each servo sector $2_i$. The technique of "stitching" together a servo sector is typically necessary since the width of the write pole 24 is less than the width of a servo track requiring a portion (e.g., half) of a servo sector to be written during each revolution of the disk. The seams created by the overwrite problem illustrated in FIGS. 2A–2C induce errors in the position error signal generated when reading the servo bursts 14 as well as errors in detecting the servo data field 12, such as the Gray coded track addresses.

The prior art has suggested a number of techniques for addressing the overwrite problem when servo writing a disk drive using perpendicular magnetic recording. For example, U.S. Pat. No. 6,504,675 discloses a disk drive wherein the write pole has a trapezoidal shape in order to reduce the overwrite problem caused by the skew effect. However, the geometry of the trapezoidal shape varies between each disk drive due to tolerances in manufacturing the head, resulting in undesirable seams in the servo wedges for some percentage of the disk drives. In addition, manufacturing the write pole with a trapezoidal shape increases the manufacturing cost of the head, as well as reduces the surface area of the write pole leading to an undesirable decrease in the strength of the magnetic write flux.

U.S. Patent Application No. 2004/0061967 suggests an alternative solution to the overwrite problem by writing the servo sectors $2_0$–$2_N$ from the outer diameter of the disk to the middle diameter, and then from the inner diameter to the middle diameter. A problem with this technique, however, is the seam created near the middle diameter of the disk where the two segments of a servo wedge "meet". This seam becomes unusable (wasted) surface area, and the seek operation in the servo system must also account for the seam. This problem is exacerbated due to the disk expanding during the servo writing operation requiring a predetermined margin (wider seam) to account for the worst-case deviation in the expansion.

There is, therefore, a need to servo write the disk of a disk drive in a manner that reduces the seams caused by the write pole overwriting previously written servo data due to the skew effect.

SUMMARY OF THE INVENTION

The present invention may be regarded as a disk drive comprising a disk having a plurality of servo sectors forming a plurality of substantially linear servo wedges extending from an outer diameter of the disk to an inner diameter of the disk, wherein each servo sector is written using perpendicular magnetic recording. The disk drive further comprises a head coupled to a distal end of an actuator arm that is rotated by a rotary actuator about a pivot in order to actuate the head radially over the disk in a substantially arcuate path.

In one embodiment, the servo sectors are written onto the disk using a linear actuator, and in one embodiment, using a media writer, wherein the disk is inserted into the disk drive after writing the servo sectors onto the disk using the media writer.

In another embodiment, the disk drive further comprises control circuitry for generating a sync mark detection window commensurate with the head approaching a servo sync mark, and adjusting the sync mark detection window relative to a radial location of the head with respect to the disk. In one embodiment, the control circuitry performs a seek operation to seek the head from a current track to a target track, and the control circuitry adjusts the sync mark detection window by computing a sync window offset in response to the current track and the target track.

The present invention may also be regarded as a method of servo writing a disk of a disk drive, the disk drive comprising a rotary actuator for rotating an actuator arm about a pivot in order to actuate a head over the disk in a substantially arcuate path. A write pole is positioned at a first radial location over the disk, and a first part of a servo sector is written at the first radial location using perpendicular magnetic recording. The write pole is positioned at a second radial location over the disk, wherein the second radial location is radially aligned with the first radial location. A second part of the servo sector is written at the second radial location using perpendicular magnetic recording. The process is repeated a number of times to write a plurality of servo sectors onto the disk forming a plurality of substantially linear servo wedges extending from an outer diameter of the disk to an inner diameter of the disk.

The present invention may also be regarded as a method of detecting a servo sync mark in a servo sector recorded on a disk of a disk drive. The disk drive comprises a disk having a plurality of servo sectors forming a plurality of substantially linear servo wedges extending from an outer diameter of the disk to an inner diameter of the disk. The disk drive further comprises a rotary actuator for rotating an actuator arm about a pivot in order to actuate a head over the disk in a substantially arcuate path. A sync mark detection window is generated commensurate with the head approaching a servo sync mark of a servo sector in one of the substantially linear servo wedges. The sync mark detection window is adjusted relative to a radial location of the head with respect to the disk.

DESCRIPTION OF THE PREFERRED EMBODIMENTS

Figure 3:
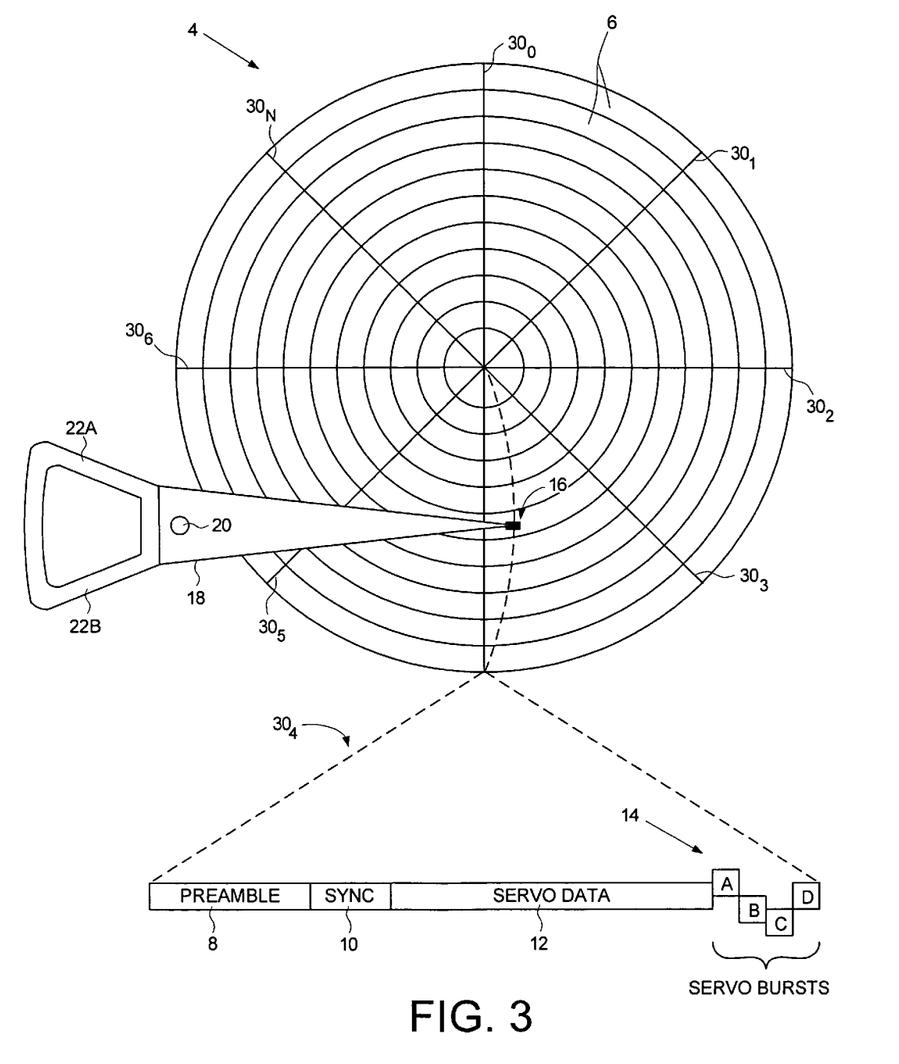
FIG. 3 shows a disk drive according to an embodiment of the present invention wherein the servo sectors are written so as to form substantially linear servo wedges, thereby eliminating the overwrite problem due to the skew effect.

FIG. 3 shows a disk drive according to an embodiment of the present invention comprising a disk 4 having a plurality of servo sectors $30_0$–$30_N$ forming a plurality of substantially linear servo wedges extending from an outer diameter of the disk 4 to an inner diameter of the disk 4, wherein each servo sector $30_i$ is written using perpendicular magnetic recording. The disk drive further comprises a head 16 coupled to a distal end of an actuator arm 18 that is rotated by a rotary actuator about a pivot 20 in order to actuate the head 16 radially over the disk 4 in a substantially arcuate path.

In the embodiment of FIG. 3, the rotary actuator comprises a voice coil having a first leg 22A and a second leg 22B. When the voice coil is energized with current the resulting magnetic flux interacts with the magnetic flux of permanent magnets (not shown) creating a torque that rotates the actuator arm 18 about the pivot 20 in order to access a target data track 6 during write and read operations.

Figure 4A:
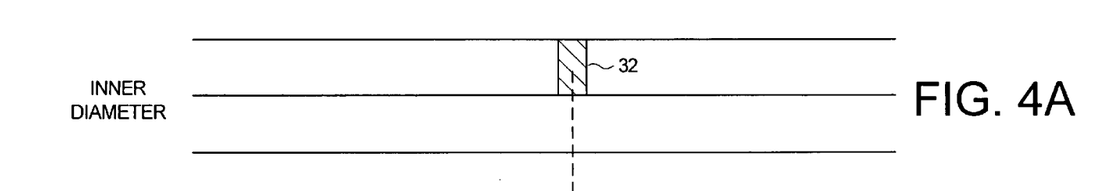
FIGS. 4A–4C illustrate servo sectors that are aligned radially forming substantially linear servo wedges.
Figure 4B:
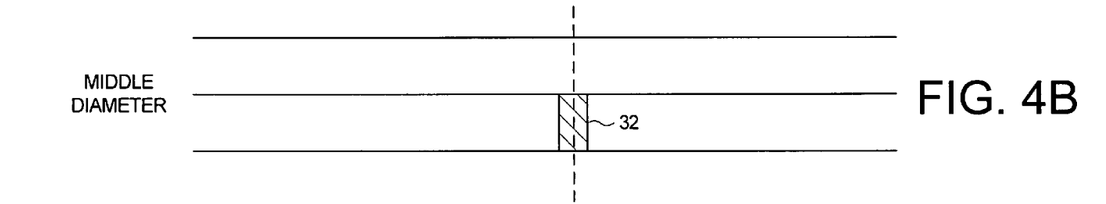
Figure 4C:
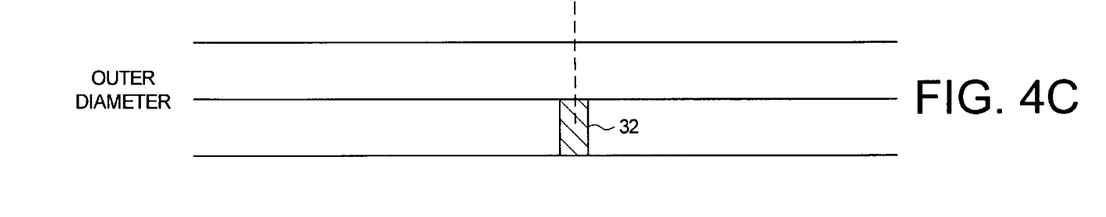

Servo writing the disk 4 with servo sectors $30_0$–$30_N$ that form substantially linear servo wedges essentially eliminates the overwrite problem caused by the skew effect of servo writing the disk 4 with arcuate wedges as described above with reference to FIGS. 2A–2C. This is illustrated in FIGS. 4A–4C, which shows a zero skew angle for a write pole 32 while writing the servo sectors $30_0$–$30_N$ from the inner diameter (FIG. 4A) to the outer diameter of the disk (FIG. 4C).

Figure 5:
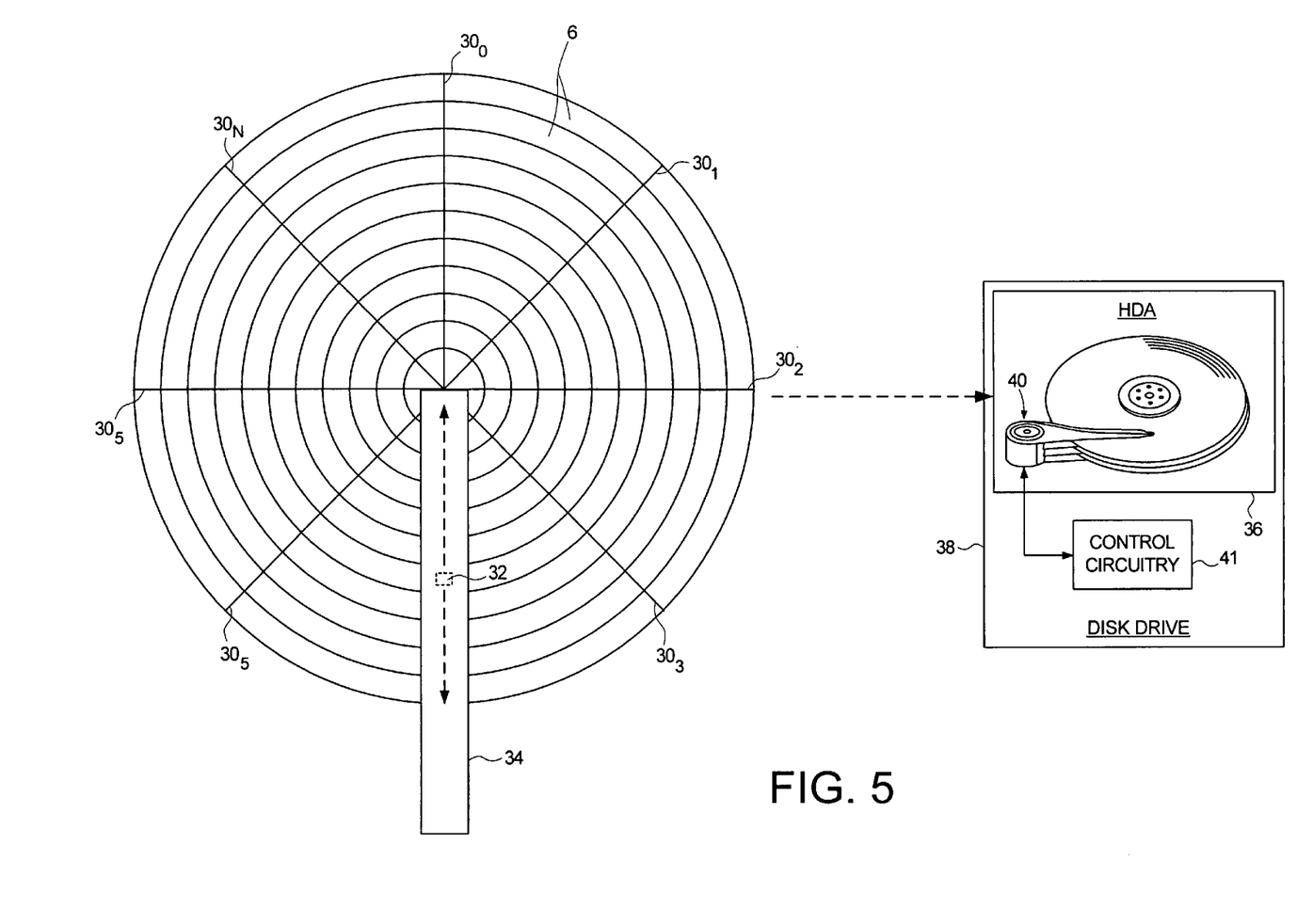
FIG. 5 shows an embodiment of the present invention wherein a media write uses a linear actuator to servo write the servo sectors onto a disk which is then inserted in the head disk assembly (HDA) of a disk drive comprising a rotary actuator.

The servo sectors $30_0$–$30_N$ may be written to the disk 4 in any suitable manner, such as using a magnetic printing technique wherein the servo sectors are "stamped" onto the disk 4. In another embodiment, a linear actuator is used to servo write the servo sectors $30_0$–$30_N$, and in an embodiment shown in FIG. 5, a media write employing a linear actuator 34 is used to servo write the servo sectors $30_0$–$30_N$ to form substantially linear servo wedges. After servo writing the disk 4, the disk 4 is removed from the media writer and installed in to the head disk assembly (HDA) 36 of a product disk drive 38 which comprises a rotary actuator 40 (such as the rotary actuator shown in FIG. 3). The product disk drive 38 comprises control circuitry 41 for controlling the operation of the disk drive 38, for example, by adjusting a sync window offset relative to the radial location of the head 16 as described below with reference to FIG. 7 and FIG. 8.

A further aspect of the present invention is a method of reliably detecting the servo sync marks 10 in the servo sectors $30_0$–$30_N$ when using linear servo wedges and a rotary actuator 40. If the head 16 internal to the disk drive is used to write arcuate servo wedges as shown in FIG. 1, then the servo sync marks 10 are detected at the same circumferential time stamp from the inner to outer diameter tracks. Thus, once a conventional disk drive is synchronized to the servo sectors, a sync mark detection window is opened at a substantially fixed interval independent of the radial location of the head 16. Enabling the servo sync mark detector during a sync mark detection window helps ensure a servo sync mark is not falsely detected in the user data or servo data area.

Figure 6A:
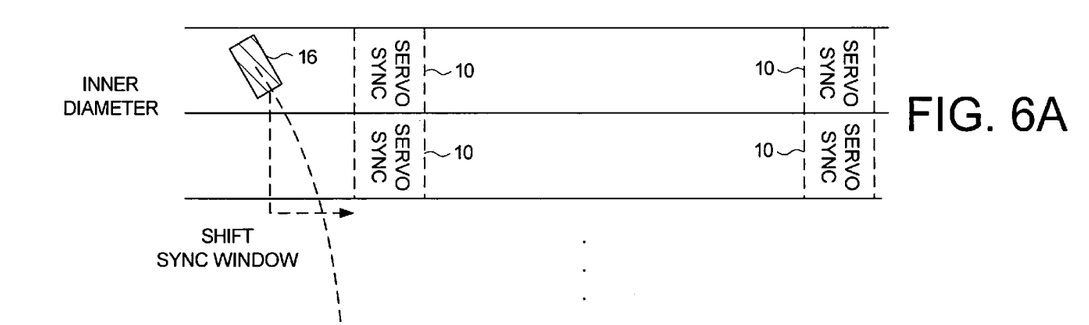
FIGS. 6A–6C illustrate an embodiment of the present invention wherein a sync window is adjusted relative to a radial location of the head to compensate for the offset due to using a rotary actuator to read linear servo wedges.
Figure 6B:
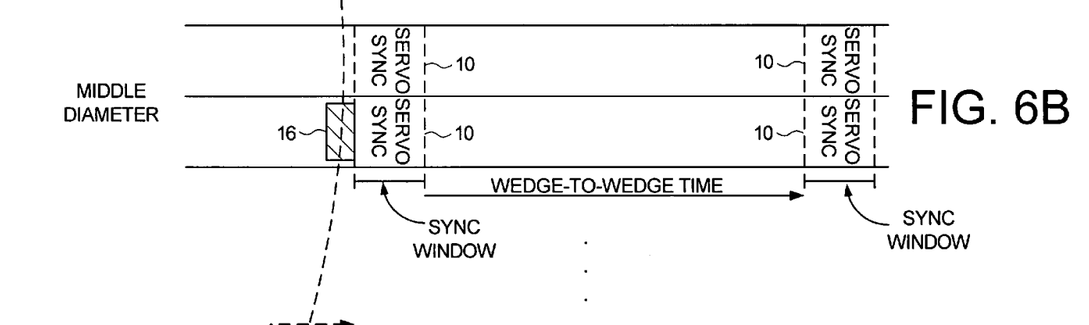
Figure 6C:
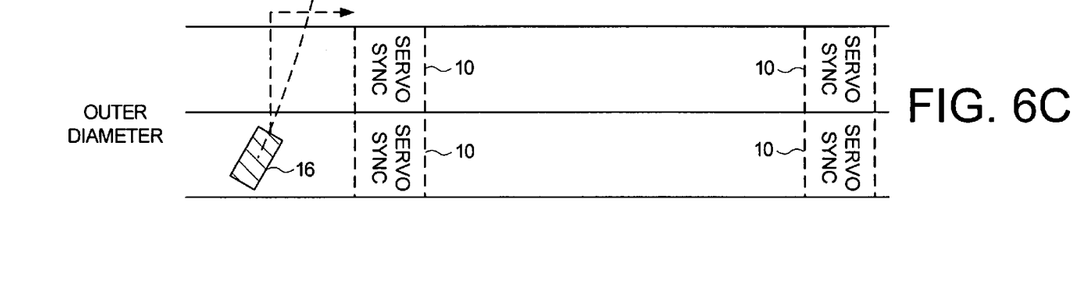

When the servo sectors $30_0$–$30_N$ are written to form linear servo wedges as shown in FIGS. 6A–6C, the skew effect of the head 16 results in an offset in the sync mark detection window relative to the radial location of the head 16 from the inner diameter (FIG. 6A) to the outer diameter (FIG. 6C). To compensate for this offset, in one embodiment a sync window offset (SWO) is computed as a function of the current track the head 16 is over and the target track of a seek operation.

In one embodiment, the SWO is computed by first determining the maximum SWO for the inner and outer diameter tracks relative to an apex track (e.g., a middle track). This embodiment is described with reference to the flow diagram of FIG. 7 executed by the control circuitry 41 wherein at step 42 the disk is spun up to speed (e.g., after power on) and at step 44 the head is unparked or loaded onto the disk. Since the location of the servo sectors is initially unknown, the head is controlled using a velocity control loop during the unpark/load operation, for example, by evaluating the BEMF voltage generated by the rotary actuator. At step 46 a velocity-loop seek is executed to move the head to the apex track, that is, the track located at (or very near) the apex of the arcuate path shown in FIGS. 6A–6C. In one embodiment, the tolerances in manufacturing the disk drive are minimized so that the apex track is known (e.g., the middle track). In another embodiment, the apex track is discovered for each disk drive during the spin-up operation, for example, by synchronizing to a track that is offset from the apex track, initializing SWO to zero, and then adjusting the SWO while seeking toward the apex track, wherein the apex track is detected when the SWO begins to decrease.

Figure 7:
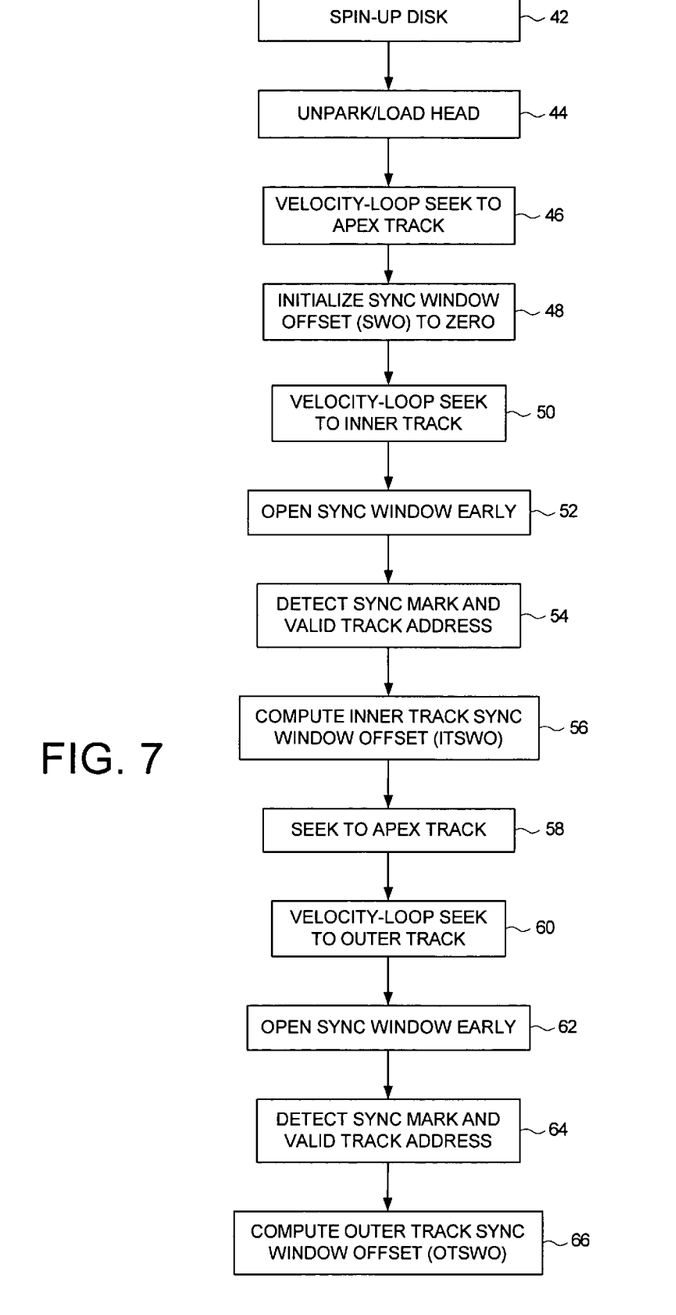
FIG. 7 is a flow diagram according to an embodiment of the present invention for calibrating the sync window offset for the inner and outer diameter tracks.

Once synchronized to the servo sectors in the apex track, at step 48 the SWO is initialized to zero. Then at step 50 the control circuitry 41 executes a velocity-loop seek to move the head to an inner track. At the end of the seek operation, at step 52 the sync mark detection window is opened early to ensure that the servo sync mark is detected at step 54. In one embodiment, the detection of the servo sync mark is qualified by detecting a valid track address (a track address at or near the target inner track), thereby ensuring the reliability of the detected servo sync mark. At step 56 an inner track sync window offset (ITSWO) is computed, for example, by computing the difference between when the apex track servo sync mark is detected and when the inner track servo sync mark is detected as determined from a clock synchronized to the rotation of the disk.

At step 58, the control circuitry 41 seeks the head back to the apex track using either a velocity-loop seek or position-loop seek by adjusting the sync mark detection window as described below with reference to FIG. 8. At step 60, the control circuitry 41 executes a velocity-loop seek to move the head to an outer diameter track. At the end of the seek operation, at step 62 the sync mark detection window is opened early to ensure that the servo sync mark is detected at step 64. In one embodiment, the detection of the servo sync mark is qualified by detecting a valid track address (a track address at or near the target outer track), thereby ensuring the reliability of the detected servo sync mark. At step 66 an outer track sync window offset (OTSWO) is computed, for example, by computing the difference between when the apex track servo sync mark is detected and when the outer track servo sync mark is detected as determined from a clock synchronized to the rotation of the disk.

After determining the maximum SWO at the inner and outer diameter tracks, the SWO is adjusted relative to the current track the head is over and the target track of each seek operation. The SWO may be adjusted for each seek operation using any suitable algorithm, an example of which is shown in FIG. 8. If at step 68 the current track (CT) is greater than the apex track, and at step 70 the target track (TT) is greater than the apex track, and at step 72 the TT is greater than CT, then at step 74 the SWO is decremented by:
  (TT−CT)/(OT−APEX)*OTSWO wherein OT is the outer track number (largest track number) and APEX is the apex track number. If TT is less than CT at step 72, then at step 76 the SWO is incremented by:
  (CT−TT)/(OT−APEX)*OTSWO.

If at step 70 TT is less than the apex track, then at step 78 the SWO is incremented by:
  (CT−APEX)/(OT−APEX)*OTSWO and at step 80 the SWO is decremented by:
  (APEX−TT)/(APEX)*ITSWO.

If at step 68 the CT is less than the apex track, and at step 82 the TT is less than the apex track, and at step 84 the TT is less than the CT, then at step 86 the SWO is decremented by:
  (CT−TT)/(APEX)*ITSWO.

If the TT is greater than the CT at step 84, then at step 88 the SWO is incremented by:
  (TT−CT)/(APEX)*ITSWO.

If the TT is greater than the apex track at step 82, then at step 90 the SWO is incremented by:
  (APEX−CT)/(APEX)*ITSWO and at step 92 the SWO is decremented by:
  (TT−APEX)/(OT−APEX)*OTSWO.

In one embodiment, the SWO is adjusted (decremented or incremented) by a predetermined quantity (e.g., one clock cycle) during the seek operation as the head moves from track to track. This enables the servo control system to remain synchronized to the servo sectors throughout the seek operation until the target track is reached.

Figure 8:
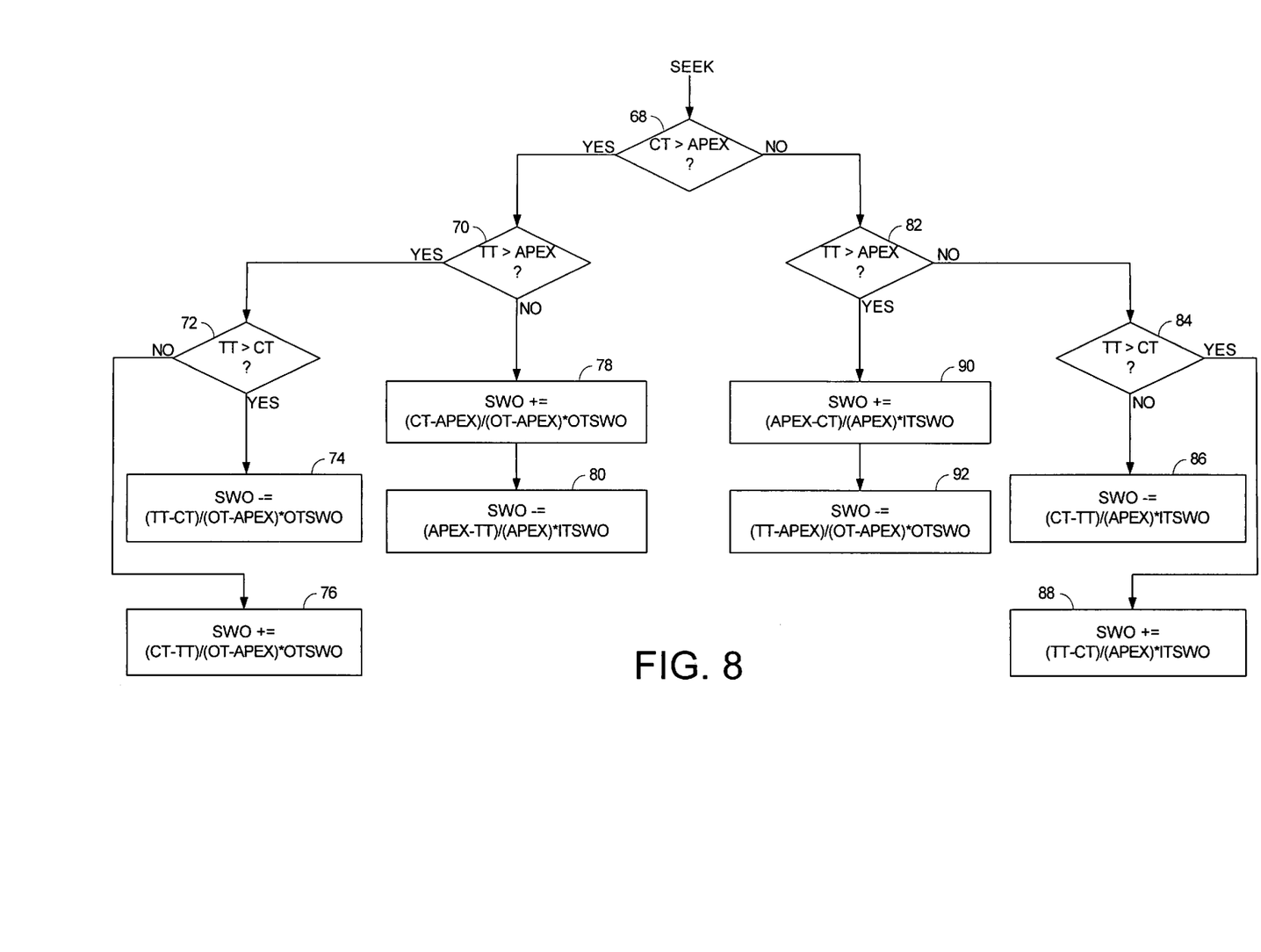
FIG. 8 is a flow diagram according to an embodiment of the present invention for computing a sync window offset relative to a current track and a target track of a seek operation.

In the embodiment shown in FIG. 8, the inner diameter track is the lowest track number (zero) and the outer diameter track is the highest track number; however, the track numbering and equations disclosed in FIG. 8 could easily be reversed so that the outer diameter track is the lowest track number (zero) and the inner diameter track is the highest track number. In yet another embodiment, the inner track sync window offset (ITSWO) and the outer track sync window offset (OTSWO) are calibrated (FIG. 7) during manufacture of each disk drive and then stored in a non-volatile semiconductor memory for use while the disk drive is in-the-field.

We claim:

1. A disk drive comprising:
   (a) a disk comprising a plurality of servo sectors forming a plurality of substantially linear servo wedges extending from an outer diameter of the disk to an inner diameter of the disk, wherein each servo sector is written using perpendicular magnetic recording;
   (b) an actuator arm;
   (c) a head coupled to a distal end of the actuator arm;
   (d) a rotary actuator for rotating the actuator arm about a pivot in order to actuate the head radially over the disk in a substantially arcuate path; and wherein each servo sector comprises a servo sync mark and the disk drive further comprises control circuitry for: (a1) generating a sync mark detection window commensurate with the head approaching a servo sync mark; and (b) adjusting the sync mark detection window relative to a radial location of the head with respect to the disk.

2. The disk drive as recited in claim 1, wherein:
(a) the control circuitry performs a seek operation to seek the head from a current track to a target track; and
(b) the control circuitry adjusts the sync mark detection window by computing a sync window offset in response to the current track and the target track.

3. A method of detecting a servo sync mark in a servo sector recorded on a disk of a disk drive, the disk drive comprising a disk having a plurality of servo sectors forming a plurality of substantially linear servo wedges extending from an outer diameter of the disk to an inner diameter of the disk, a rotary actuator for rotating an actuator arm about a pivot in order to actuate a head over the disk in a substantially arcuate path, the method comprising the steps of:
(a) generating a sync mark detection window commensurate with the head approaching a servo sync mark of a servo sector in one of the substantially linear servo wedges; and
(b) adjusting the sync mark detection window relative to a radial location of the head with respect to the disk.

4. The method as recited in claim 3, wherein the step of adjusting the sync mark detection window comprises the step of computing a sync window offset in response to a current track the head is currently over and a target track of a seek operation.

* * * * *